United States Patent
Yu

(10) Patent No.: US 9,325,389 B2
(45) Date of Patent: Apr. 26, 2016

(54) REDUCING DISTORTION IN RADIO COMMUNICATION FOR HIGH SPEED VEHICLE

(71) Applicant: Empire Technology Development LLC, Wilmington, DE (US)

(72) Inventor: Haiying Yu, Shanghai (CN)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 14/357,854

(22) PCT Filed: May 27, 2013

(86) PCT No.: PCT/CN2013/076245
§ 371 (c)(1),
(2) Date: May 13, 2014

(87) PCT Pub. No.: WO2014/190463
PCT Pub. Date: Dec. 4, 2014

(65) Prior Publication Data
US 2015/0171936 A1    Jun. 18, 2015

(51) Int. Cl.
*H04B 7/12* (2006.01)
*H04B 1/12* (2006.01)
*H04B 7/01* (2006.01)
*H04L 1/06* (2006.01)
*H04B 7/08* (2006.01)

(52) U.S. Cl.
CPC .. *H04B 7/01* (2013.01); *H04B 1/12* (2013.01); *H04B 7/0837* (2013.01); *H04L 1/06* (2013.01)

(58) Field of Classification Search
CPC ................................... H04B 7/01; H04B 1/12
See application file for complete search history.

(56) References Cited

U.S. PATENT DOCUMENTS

| | | | |
|---|---|---|---|
| 7,844,312 B2 | 11/2010 | Macht et al. | |
| 7,904,085 B2 | 3/2011 | Nakata et al. | |
| 8,041,356 B2 * | 10/2011 | Voyer | H04W 36/18 455/436 |
| 2003/0008623 A1 | 1/2003 | Uesugi | |
| 2003/0214417 A1 | 11/2003 | Peltz et al. | |

FOREIGN PATENT DOCUMENTS

| CN | 1383627 A | 12/2002 |
|---|---|---|
| WO | 2005022777 A1 | 3/2005 |
| WO | 2005022778 A1 | 3/2005 |

OTHER PUBLICATIONS

"Satellite Internet on Thalys High Speed Trains—A Report," acccessed at http://web.archive.org/web/20110626095920/http://mobilesociety.typepad.com/mobile_life/2009/06/satellite-internet-on-thalys-high-speedtrains-a-report.html, Jun. 2, 2009, pp. 1-2.

(Continued)

*Primary Examiner* — Bobbak Safaipour
(74) *Attorney, Agent, or Firm* — Brundidge & Stanger, P.C.

(57) ABSTRACT

For a wireless communication between a high speed vehicle and a base station, communication signals received by two or more antennas at different locations of the high speed vehicle may be combined and further processed to reduce the distortion caused by some natural phenomena including the Doppler Effect.

15 Claims, 4 Drawing Sheets

(56) References Cited

OTHER PUBLICATIONS

"High Speed Internet Access on a High-Speed Train," accessed at http://web.archive.org/web/20080423020540/http://telecom.esa.int/telecom/www/object/index.cfm?fobjectid=14383, Sep. 8, 2004, p. 1-1.

International Search Report with Written Opinion for International Application No. PCT/CN2013/076245 mailed on Mar. 6, 2014.

* cited by examiner

REDUCING DISTORTION IN RADIO COMMUNICATION FOR HIGH SPEED VEHICLE

CROSS-REFERENCE TO RELATED APPLICATION

This Application is the U.S. National Stage filing under 35 U.S.C. §371 of PCT Application No. PCT/CN13/76245, filed on May 27, 2013.

TECHNICAL FIELD

The technologies described herein pertain generally to reducing distortion in radio communications, attributable to some natural phenomena including the Doppler Effect, for high speed vehicles.

BACKGROUND

Unless otherwise indicated herein, the approaches described in this section are not prior art to the claims in this application and are not admitted to be prior art by inclusion in this section.

For a wireless communication between a high speed vehicle and a base station, communication signals received by the high speed vehicle are often distorted because of some natural phenomena including the Doppler Effect, which may be attributable to the high rate speed at which the vehicle is moving.

SUMMARY

Technologies are generally described for reducing distortion in radio communication for a high speed vehicle. The various techniques may be implemented in various devices, methods and/or systems.

In some examples, various techniques may be implemented as methods on a high speed vehicle. Some methods may include collecting a plurality of signals, each of which is received at a respective one of a plurality of locations of a moving platform, carries at least a portion of first data, and has a respective signal distortion; combining the received plurality of signals to obtain the first data; and transmitting the first data to one or more users on the moving platform.

In some examples, various techniques may be implemented as computer-readable medium storing instructions that, when executed, may cause one or more processors to perform one or more operations. The operations may include receiving a first signal that is obtained by a first antenna at a first location on a moving platform and that has a first signal distortion, receiving a second signal that is obtained by a second antenna at a second location on the moving platform and that has a second signal distortion that is different from the first signal distortion combining the first signal and the second signal to obtain a resultant signal, and transmitting the resultant signal to one or more wireless service users on the moving platform.

In some other examples, various embodiments may be implemented as a device. Some example devices may include at least a first antenna and a second antenna that are disposed at different locations on a moving platform and a processor that is coupled to the first antenna and the second antenna. The processor may be configured to receive a first signal that is obtained by a first antenna at a first location on the moving platform and that has a first signal distortion, to receive a second signal that is obtained by a second antenna at a second location on the moving platform and that has a second signal distortion, which is different from the first signal distortion, and to combine the first signal and the second signal to obtain a resultant signal.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items. In the drawings.

DETAILED DESCRIPTION

Figure 1:
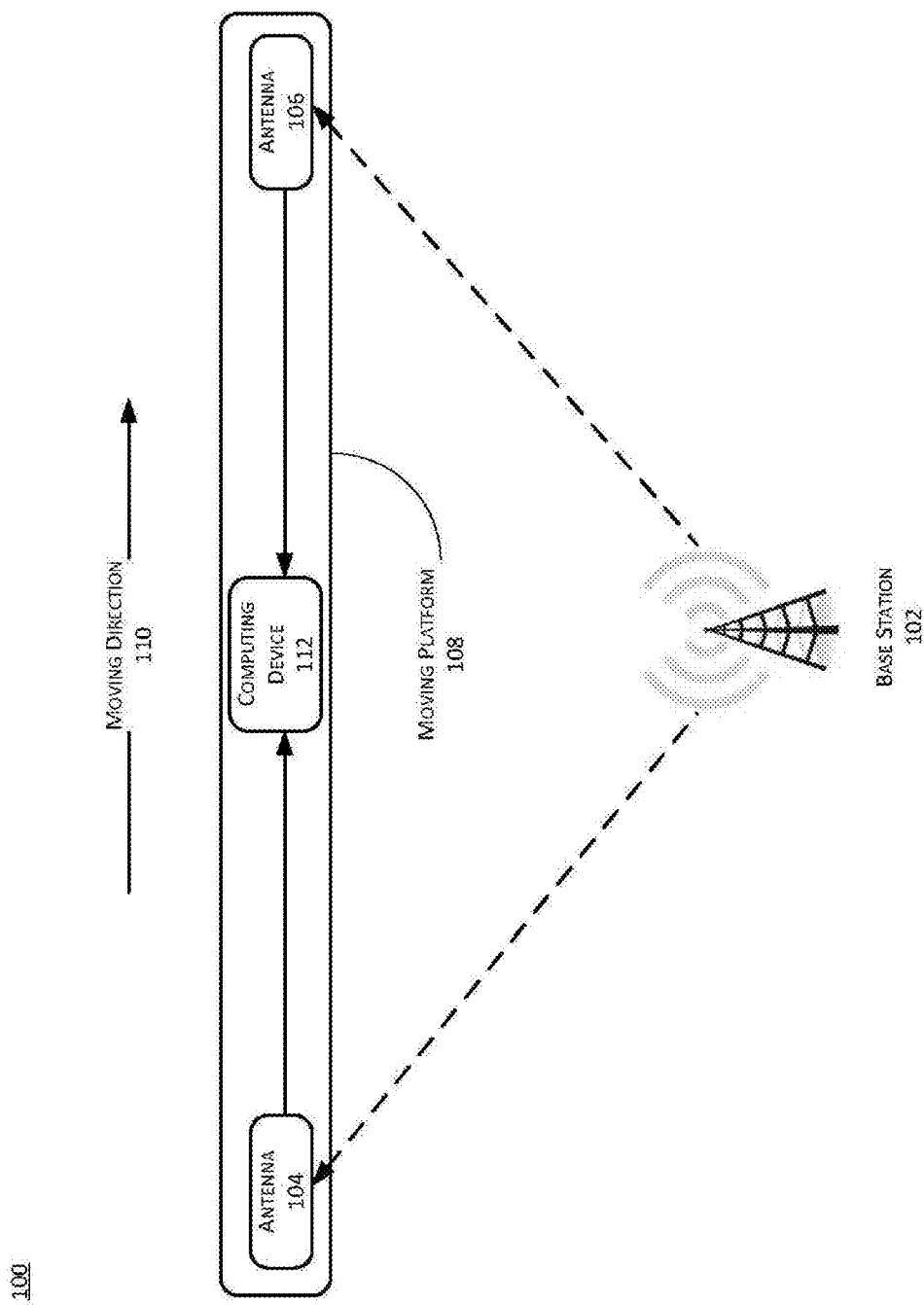
FIG. 1 shows an example wireless communication system in which reducing distortion in radio communication for high speed vehicle may be implemented, in accordance with examples described herein.

In the following detailed description, references are made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

FIG. 1 shows an example wireless communication system 100, in which one or more embodiments of reducing distortion in radio communication for high speed vehicle may be implemented, in accordance with examples described herein. As depicted, example wireless communication system 100 may include a base station 102 that communicates with a moving platform 108, which is moving in direction 110. Moving platform 108 may include an antenna 104 and an antenna 106, both of which may be communicatively coupled to a computing device 112.

Base station 102 may refer to a wireless communication station that may be configured to provide wireless communication to one or more wireless communication devices within a corresponding range of coverage. Base station 102 may be installed at a fixed location or may be implemented as a mobile base. Further, base station 102 may transmit wireless signals to and from moving platform 108. Base station 102 may be configured to support wireless communication between one or more embodiments of moving platform located within a corresponding cell. Such communication may be in accordance with different wireless communication standards including Time Division Duplex Long Term Evolution (TDD-LTE), Frequency Division Duplexing (FDD-LTE), IEEE 802.15.4, Global System for Mobile Communications (GSM), General packet radio service (GPRS), Code Division Multiple Access (CDMA), 3rd generation of mobile telecommunications technology (3G), etc., which may further determine the work mode of moving platform 108. The aforementioned work mode of moving platform 108 may include, e.g., TDD mode or FDD mode. Such examples are not intended to be limiting, and therefore should not be interpreted to be so.

Moving platform 108 may refer to any type of conveyance that moves in direction 110, examples of which may include cars, buses, trollies, trains, rapid transit (e.g., subways, monorails, and trains), etc. Moving platform 108 may be configured to have at least antenna 104 and antenna 106 affixed thereto to receive wireless signals from base station 102 when moving platform 108 is within the radio coverage of base station 102. Moving platform 108 may further include a computing device for further processing the received wireless signals, e.g., computing device 112, in accordance with one or more embodiments of reducing distortion in radio communication for high speed vehicles.

Antennae 104 and 106, respectively, may refer to a component or module, implemented as software, firmware, or any combination thereof, that may be configured to receive wireless signals from base station 102. That is, antennae 104 and 106 may each be configured to convert electromagnetic waves into electric power, and vice versa, and then to receive signals for wireless communication. When receiving wireless signals from base station 102 or from other communication devices, at least one of antennae 104 and 106 may intercept some of the power of electromagnetic waves of the wireless signals to produce a relative lower voltage at its terminals, at which the received signals may be further amplified. The amplified signals may be transmitted to computing device 112 for further processing. In accordance with at least some example embodiments, antenna 104 may be installed on moving platform 108, at or near the back end thereof with respect to moving direction 110, and antenna 106 may be installed on moving platform 108, at or near the front end with respect to moving direction 110.

Computing device 112 may refer to a physical programmable device that may be configured to process the amplified signals for reducing distortions. Computing device 112 may refer to any device that may be programmed to carry out a finite set of arithmetic or logical operations and may, at least, be implemented as a personal computer including both laptop computer and non-laptop computer.

In accordance with some examples, as moving platform 108 travels in moving direction 110 and base station 102 is substantially equi-distant from antenna 104 and antenna 106, signals received by both of antennae 104 and 106, from base station 102, may be distorted due to what is known as the Doppler Effect. The Doppler Effect may refer to a natural phenomenon by which a wave frequency changes in accordance with relative movement between the receiver and the wave source. The wave may be electromagnetic or sound wave. Thus, signals received by antenna 106, from base station 102, may be compressed in frequency domain and signals received by antenna 104, from base station 102, may be expanded in frequency domain. In other words, signals received may be distorted because of the Doppler Effect. In order to reduce the distortion, computing device 112 may be configured to multiply the signals received by antenna 104 and the signals received by antenna 106. Further, computing device 112 may be configured to generate resultant signals by calculating a square root of a result of the multiplying. The resultant signals may be transmitted to one or more wireless communication devices on moving platform 108, e.g., cell-phones, tablets, laptops, or other client devices, on a moving train, to provide wireless communication to base station 102 for users on the moving platform, e.g., passengers on the train.

In accordance with other examples, as moving platform 108 continues to travel in moving direction 110 and base station 102 is closer to antenna 104 than to antenna 106, computing device 112 may be configured similarly to multiply the received signals via antenna 104 and antenna 106, respectively, to calculate a square root of the resulting product. Similarly, the resultant signals may be generated based on the calculated square root.

Signals transmitted by base station 102 may be represented as s(t), signals received by antenna 106 may be referred as $s_1(t)=s(t)e^{-j2\pi Vt}$ and signals received by antenna 104 may be referred as $s_2(t)=s(t)e^{j2\pi Vt}$. The result of multiplying the received signals may be $S=s_1(t) \times s_2(t)= s(t)e^{-j2\pi Vt} \times s(t)e^{j2\pi Vt}=s^2(t)$. The square root of the result of multiplying, i.e., the resultant signals, may be substantially close to the original signals transmitted by base station 102, and, thus, the distortion caused by the Doppler Effect may be reduced, regardless of the distance between moving platform 108 and base station 102.

Thus, FIG. 1 shows an example wireless communication system 100 in which one or more embodiments of reducing distortion in radio communication for high speed vehicle may be implemented.

Figure 2:
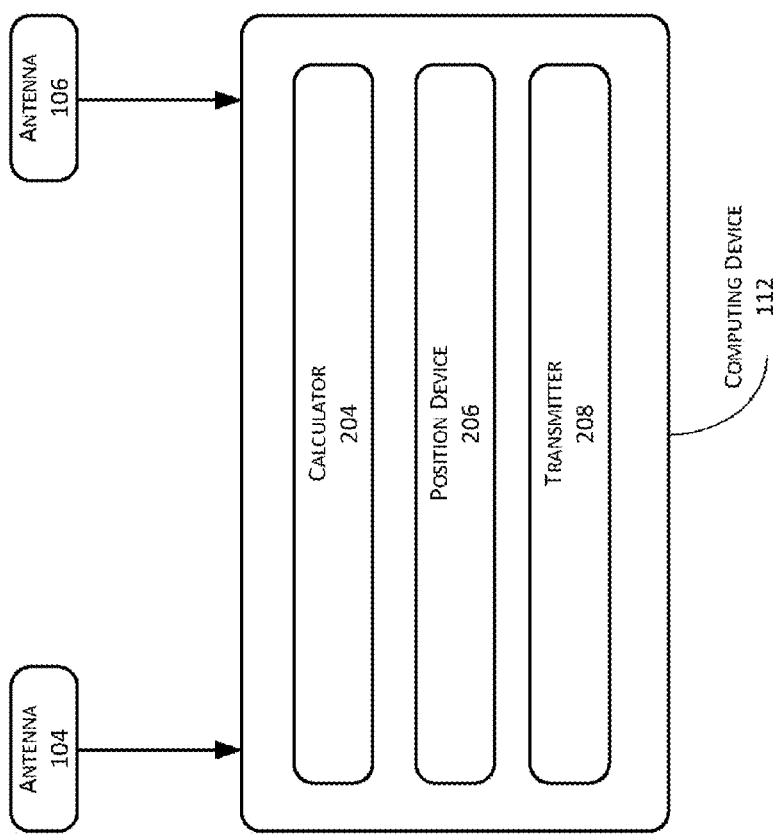
FIG. 2 shows an example computing device by which reducing distortion in radio communication for high speed vehicle may be implemented, in accordance with examples described herein.

FIG. 2 shows an example computing device 112 by which one or more embodiments of reducing distortion in radio communication for high speed vehicle may be implemented, in accordance with examples described herein. As depicted, example computing device 112, communicatively coupled to antenna 104 and antenna 106, includes at least a calculator 204, a position device 206, and a transmitter 208.

Calculator 204 may refer to a component or module, implemented as software, firmware, or any combination thereof, that may be configured to carry out a finite set of arithmetic or logical operations on the values of the signals received at either of antennae 104 and 106. In accordance with some examples, calculator 204 may be configured to combine, or multiply, signals received via antenna 104 and antenna 106 and, further, calculate a square root of the result of the combining, or multiplying. Resultant signals based on the square root may be generated and further disseminated, by transmitter 208, to one or more wireless communication devices on moving platform 108.

Position device 206, coupled to calculator 204, may refer to one or more sensors configured to provide spatial information related to moving platform 108 and any base station close enough to provide wireless communication. Non-limiting examples of position device 206 may include a Global Position System (GPS) module. An example GPS module may be utilized to generate GPS positional information (e.g., latitude, longitude, altitude; Doppler; etc.) of moving platform 108 and base stations available, which may be monitored and/or recorded by computing device 112. In some examples, computing device 112 may be configured to intelligently select one from the base stations, e.g., base station 102, to provide wireless communication for moving platform 108 based on the positional information. That is, when antennae 104 and 106 experiences a substantially similar distortion caused by Doppler Effect that is symmetric with respect to 0 Hz, e.g., +200 Hz and −200 Hz, computing device 112 may select one from the base stations located within a belt range perpendicular to and approximately at the center of moving platform 108.

Transmitter 208 may refer to a component or module that may be configured to, in transmission, transform radio frequency electric current into digital or analog signals. In accordance with some examples, transmitter 208 may be configured to receive the resultant signals generated by calculator 204 and further disseminate the resultant signals to one or more wireless communication devices, or service users, on moving platform 108.

Thus, FIG. 2 shows an example computing device 112 by which one or more embodiments of reducing distortion in radio communication for high speed vehicle may be implemented.

Figure 3:
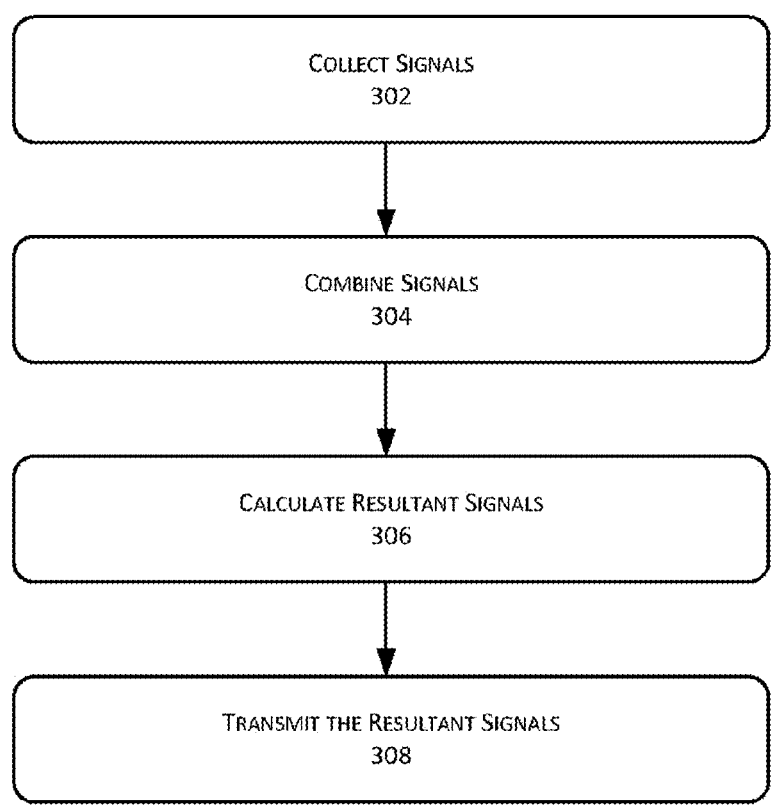
FIG. 3 shows an example configuration of a processing flow 300, which reducing distortion in radio communication for high speed vehicle may be implemented, in accordance with examples described herein.

FIG. 3 shows an example configuration of a processing flow 300 by which one or more embodiments of reducing distortion in radio communication for high speed vehicle may be implemented, in accordance with examples described herein. As depicted, processing flow 300 may include sub-processes executed by various components that are part of example wireless communication system 100. However, processing flow 300 is not limited to such components, as obvious modifications may be made by re-ordering two or more of the sub-processes described here, eliminating at least one of the sub-processes, adding further sub-processes, substituting components, or even having various components assuming sub-processing roles accorded to other components in the following description. Processing flow 300 may include various operation, functions, or actions as illustrated by one or more of blocks 302, 304, 306, and/or 308. Processing may begin at block 302.

Block 302 (Collect Signals) may refer to computing device 112 collecting signals, received at either of antennae 104 and 106 from base station 102, each of which may include communicative data. Antennae 104 and 106, respectively, may be placed or installed or affixed to different locations of moving platform 108. Each of the different locations may be substantially close to a rear and a forward end of moving platform 108. For example, antenna 104 may be installed or otherwise affixed substantially close to the back end of moving platform 108, with respect to moving direction 110; and antenna 106 may be installed or otherwise affixed substantially close to the front end of moving platform 108, with respect to moving direction 110. In accordance with some examples, moving platform 108 may move, e.g., in moving direction 110 (see FIG. 2) at a high rate of speed, e.g., 195 km/h. Due to Doppler Effect, signals received by antenna 104/106 may be distorted. As set forth above, the Doppler Effect may refer to a natural phenomenon that describes the change in frequency of a wave caused by the relative moving between the receiver and the wave source. The wave may be electromagnetic or sound wave. That is, signals received by antenna 106 may be compressed in frequency domain, and signals received by antenna 104 may be expanded in frequency domain. Processing may continue from block 302 to 304.

Block 304 (Combine Signals) may refer to computing device 112 combining the signals, received respectively by antennae 104 and 106, for the purpose of obtaining the data carried by the signals. In accordance with some examples, computing device 112 may be configured to multiply the signals received by antenna 104 and the signals received by antenna 106. Processing may continue from block 304 to 306.

Block 306 (Calculate Resultant Signals) may refer to computing device 112 calculating a square root of the resulting product of the multiplied signals, received respectively by antenna 104 and antenna 106. Resultant signals may be generated based on the calculation. Processing may continue from block 306 to 308.

Block 308 (Transmit the Resultant Signals) may refer to transmitter 208 transmitting the resultant signals to one or more users, or one or more wireless communication devices, on moving platform 108. Wireless communication devices may be implemented as a portion of a small-form factor portable (or mobile) electronic device such as a cell phone, a personal digital assistant (PDA), a personal media player device, a wireless web-watch device, a personal headset device, an application specific device, or a hybrid device that include any of the above functions. The resultant signals may carry the same data as the signals received by antennae 104 and 106.

Thus, FIG. 3 shows an example configuration of a processing flow 300 by which one or more embodiments of reducing distortion in radio communication for high speed vehicle may be implemented.

Figure 4:
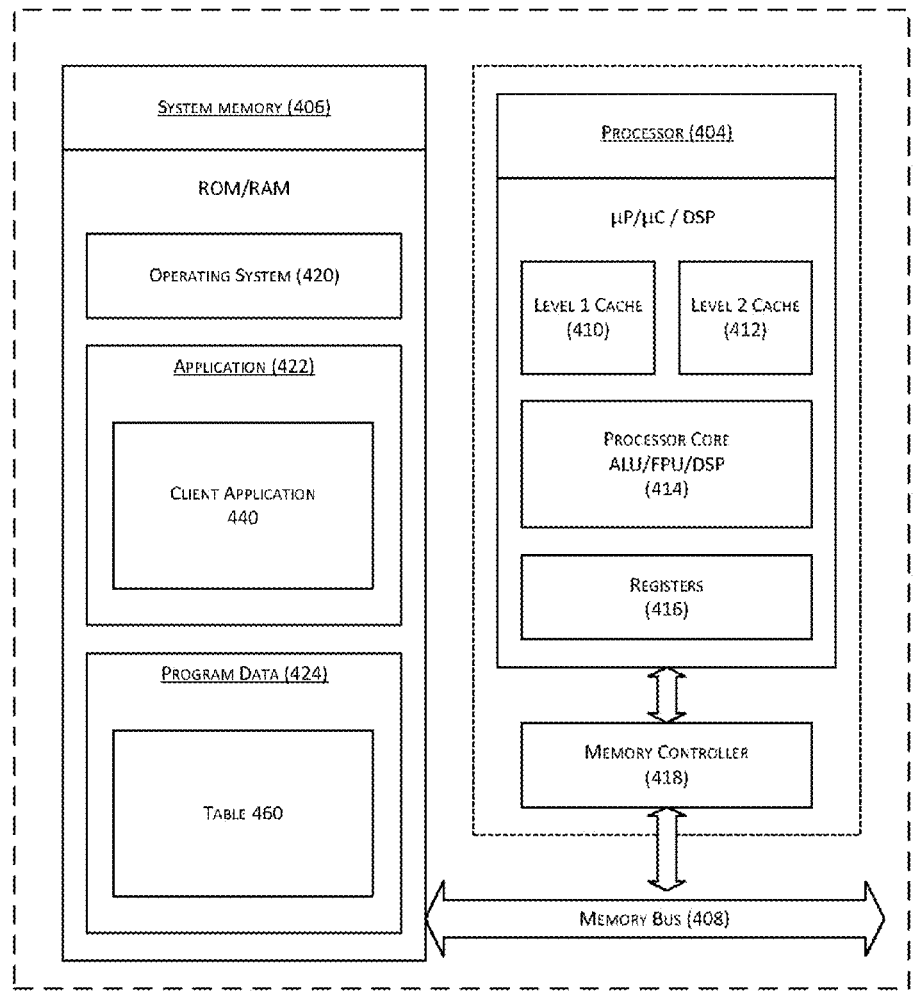
FIG. 4 shows a block diagram illustrating an example computing device that is arranged for reducing distortion in radio communication for high speed vehicle, in accordance with examples described herein.

FIG. 4 shows a block diagram illustrating an example computing device that is arranged for reducing distortion in radio communication for high speed vehicle.

More particularly, FIG. 4 shows an illustrative computing embodiment, in which any of the processes and sub-processes described herein may be implemented as computer-readable instructions stored on a computer-readable medium. The computer-readable instructions may, for example, be executed by a processor of a device, as referenced herein, having a network element and/or any other device corresponding thereto, particularly as applicable to the applications and/or programs described above corresponding to the example wireless communication system.

In a very basic configuration, a computing device 400 may typically include one or more processors 404 and a system memory 406. A memory bus 408 may be used for communicating between processor 404 and system memory 406.

Depending on the desired configuration, processor 404 may be of any type including but not limited to a microprocessor (μP), a microcontroller (μC), a digital signal processor (DSP), or any combination thereof. The processor 404 may include one or more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with the processor 404, or in some implementations the memory controller 418 may be an internal part of the processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424.

Application 422 may be configured with a client application 440 to configure TDD mode as described previously with respect to FIGS. 1-3. Program data 424 may include a table 460, which may be useful for reducing distortion in a radio communication for high speed vehicles as described herein.

System memory 406 is an example of computer storage media. Computer storage media may include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes for wireless communication system 100 via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers, e.g., as one or more programs running on one or more computer systems, as one or more programs running on one or more processors, e.g., as one or more programs running on one or more microprocessors, as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors, e.g., feedback for sensing position and/or velocity; control motors for moving and/or adjusting components and/or quantities. A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Lastly, with respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

I claim:

1. A method, comprising:
   collecting a plurality of signals, each of which is received at a respective one of a plurality of locations of a moving platform, carries at least a portion of first data, and has a respective signal distortion;
   combining the received plurality of signals to obtain the first data based at least on a result of multiplying a first signal of the plurality of signals received at a first location of the plurality of locations and a second signal of the plurality of signals received at a second location of the plurality of locations; and
   transmitting the obtained first data to one or more users on the moving platform;
   wherein the first location of the plurality of locations at which the first signal is received is at a front end of the moving platform with respect to a direction in which the moving platform is moving, and
   wherein the second location of the plurality of locations at which the second signal is received is at a rear end of the moving platform with respect to the direction in which the moving platform is moving.

2. The method of claim 1, wherein the combining the received plurality of signals further comprises:
   calculating a square root of a result of the multiplying of the first signal and the second signal to obtain the first data.

3. The method of claim 1, wherein each of the plurality of signals is received at a respective location of the moving platform from a respective stationary transmitter.

4. The method of claim 1, wherein the collecting comprises:
   compressing at least a first one of the plurality of signals; and
   expanding at least a second one of the plurality of signals.

5. The method of claim 1, further comprising:
   transmitting, from two or more antennas at different locations on the moving platform, a plurality of outbound signals representing second data to one or more stationary receivers.

6. A non-transitory computer-readable medium storing instructions that, when executed, cause one or more processors to perform operations comprising:
   receiving a first signal that is obtained by a first antenna at a first location on a moving platform and that has a first signal distortion;
   receiving a second signal that is obtained by a second antenna at a second location on the moving platform and that has a second signal distortion that is different from the first signal distortion;
   combining the first signal and the second signal based on at least a result of multiplying the first signal and the second signal to obtain a resultant signal; and
   transmitting the resultant signal to one or more wireless service users on the moving platform;
   wherein the first location at which the first signal is obtained is at a front end of the moving platform with respect to a direction in which the moving platform is moving, and
   wherein the second location at which the second signal is obtained is at a rear end of the moving platform with respect to the direction in which the moving platform is moving.

7. The non-transitory computer-readable medium of claim 6, wherein the combining the first signal and the second signal further comprises calculating a square root of a result of the multiplying.

8. The non-transitory computer-readable medium of claim 6,
   wherein the first signal is received from a first transmitter and the second signal is received from a second transmitter,
   wherein the first antenna is closer to the first transmitter than the second antenna, and wherein the second antenna is closer to the second transmitter than the first antenna.

9. The non-transitory computer-readable medium of claim 6, wherein the receiving includes:
compressing the first signal; and
expanding the second signal.

10. The non-transitory computer-readable medium of claim 6, wherein data represented by the first signal and data represented by the second signal are identical.

11. The non-transitory computer-readable medium of claim 6, further comprising:
transmitting a third signal representing second data from the first antenna to one or more stationary receivers; and
transmitting a fourth signal representing the second data from the second antenna to the one or more stationary receivers.

12. A communication device, comprising:
at least a first antenna and a second antenna disposed at different locations on a moving platform; and
a processor, coupled to the first antenna and the second antenna, configured to:
receive a first signal that is obtained by the first antenna at a first location on the moving platform and that has a first signal distortion,
receive a second signal that is obtained by the second antenna at a second location on the moving platform and that has a second signal distortion, which is different from the first signal distortion, and
combine the first signal and the second signal to obtain a resultant signal based on at least a result of multiplying the first signal and the second signal received at the first location and the second location, respectively;
wherein the first location at which the first signal is obtained is at a front end of the moving platform with respect to a direction in which the moving platform is moving, and
wherein the second location at which the second signal is obtained is at a rear end of the moving platform with respect to the direction in which the moving platform is moving.

13. The communication device of claim 12, wherein the processor is further configured to calculate a square root of a result of the multiplying of the first signal and the second signal to obtain the first data.

14. The communication device of claim 12, wherein the processor is further configured to:
compress the received first signal, and
expand the received second signal.

15. The communication device of claim 12, further comprising:
a transmitter, coupled to the processor, configured to transmit data to one or more users on the moving platform.

* * * * *